(12) United States Patent
Kibler et al.

(10) Patent No.: US 7,630,471 B1
(45) Date of Patent: Dec. 8, 2009

(54) ENCODER RESET DEVICE AND METHOD

(75) Inventors: Mike Kibler, Richwood, OH (US); Lee Thompson, Marysville, OH (US); Ken Grason, Powell, OH (US); Raymond L. Reinhard, Degraff, OH (US); Charles Lowery, Belle Center, OH (US)

(73) Assignee: Honda Motor Co., Ltd., Tokyo (JP)

( * ) Notice: Subject to any disclaimer, the term of this patent is extended or adjusted under 35 U.S.C. 154(b) by 415 days.

(21) Appl. No.: 11/745,488

(22) Filed: May 8, 2007

(51) Int. Cl.
*G06M 3/00* (2006.01)
(52) U.S. Cl. ....................................... 377/30
(58) Field of Classification Search ........................ None
See application file for complete search history.

(56) References Cited

U.S. PATENT DOCUMENTS

| | | | |
|---|---|---|---|
| 4,388,576 A | 6/1983 | Blatt | |
| 4,427,970 A * | 1/1984 | Devol | 341/6 |
| 4,912,463 A * | 3/1990 | Li | 340/825.69 |
| 5,570,609 A | 11/1996 | Nihei et al. | |
| 5,677,663 A * | 10/1997 | Sansome | 340/426.35 |
| 6,211,639 B1 | 4/2001 | Meister et al. | |
| 6,325,397 B1 | 12/2001 | Pascoe et al. | |
| 7,089,085 B2 | 8/2006 | Kim | |
| 2004/0010345 A1 | 1/2004 | Kim | |
| 2005/0109088 A1 | 5/2005 | Woodruff et al. | |
| 2006/0045666 A1 | 3/2006 | Harris et al. | |

FOREIGN PATENT DOCUMENTS

JP 5-347537 * 12/1993

* cited by examiner

*Primary Examiner*—Tuan Lam
(74) *Attorney, Agent, or Firm*—Standley Law Group LLP

(57) ABSTRACT

An encoder reset device and method that allows for an encoder to be reset and/or recharged at virtually any location. A reset device and method of the present invention also allows the reset/charging process to take place simultaneously with the removal of an encoder-equipped device that is being replaced, as a device of the present invention does not require the use of an encoder-equipped device controller to perform the reset/charging process.

28 Claims, 2 Drawing Sheets

ENCODER RESET DEVICE AND METHOD

BACKGROUND OF INVENTIVE FIELD

The present invention is directed to a device and method for resetting encoders. More particularly, the present invention is directed to a device and method for simplifying and facilitating the encoder reset process, such as may be required during the replacement of a servo motor or other encoder-equipped device.

Encoders can be of various design and may be used in a variety of applications. Of particular interest is a rotary encoder. A rotary encoder is a sensor or transducer that is commonly used to convert the angular position of a device into an electronic signal.

Encoders are commonly found on servo motors and other rotation-producing devices. As such, encoders may be found in a number of industrial applications, such as on robots, lift devices, transfer devices, and a variety of other automated equipment. Encoders are typically integral to such devices. Such encoders would be well known to one skilled in the art and, therefore, need not be described in greater detail herein.

As would also be understood by one skilled in the art, the rotary devices with which such encoders are commonly associated generally require periodic replacement—whether due to normal wear or an abnormal failure. Consequently, when such a device is replaced, a new encoder is also introduced.

When installing a new rotary device, such as a servo motor with an integral encoder, it is normally required that the encoder be reset prior to use. Currently, a typical encoder reset process involves the manual jumpering of several pins on an associated encoder connector, connection of the encoder to the motor controller for charging of the encoder, disconnection of the encoder from the controller, re-jumpering of the encoder connector, and reconnection of the encoder to the controller. As such, it can be easily understood that such a process is inefficient and time consuming (especially when a large number of encoder-employing devices must be regularly replaced), and must be performed at the location of use. Further, mistakes are commonly made during a typical reset process, such as inadvertent contact with incorrect connector pins during the manual jumpering thereof.

Therefore, what is needed is a device and method for simplifying the encoder reset operation. It is also desirable to provide an encoder reset device and method that can operate without using the actual motor controller with which the encoder will be associated. By eliminating the need to use the motor controller, such a device and method would allow for an encoder to be reset while removal of the current rotary device is ongoing. Offline resetting of an encoder would also thus be provided for. An encoder reset device and method of the present invention has such capabilities.

SUMMARY OF GENERAL INVENTIVE CONCEPT

An encoder reset device and method of the present invention provided for the automatic jumpering and charging of a new encoder. An encoder reset device of the present invention preferably includes an enclosure for housing a power supply and the various circuitry (described in more detail below) necessary to perform the automatic encoder reset process.

An appropriate connector is preferably attached to a cable that is in electrical communication with the circuitry within the enclosure, and extends therefrom for connection to an encoder to be reset. Attachment of the connector of the reset device to a mating connector of an encoder functions to appropriately and automatically jumper the pins of the encoder connector. The encoder is also charged by the reset device while it is connected thereto. Resetting is completed simply by flipping a switch, pushing a button, etc.

From the foregoing brief description, it can be understood that an encoder reset device and method of the present invention is a substantial improvement over the techniques presently employed to effectuate encoder resetting. Thus, use of an encoder reset device and method of the present invention greatly simplifies the encoder reset process, thereby reducing the downtime associated with changing an encoder-equipped device. If so desired, an encoder reset device and method of the present invention also permits an encoder to be reset offline from the device or equipment with which the encoder will ultimately be used.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

Figure 1:
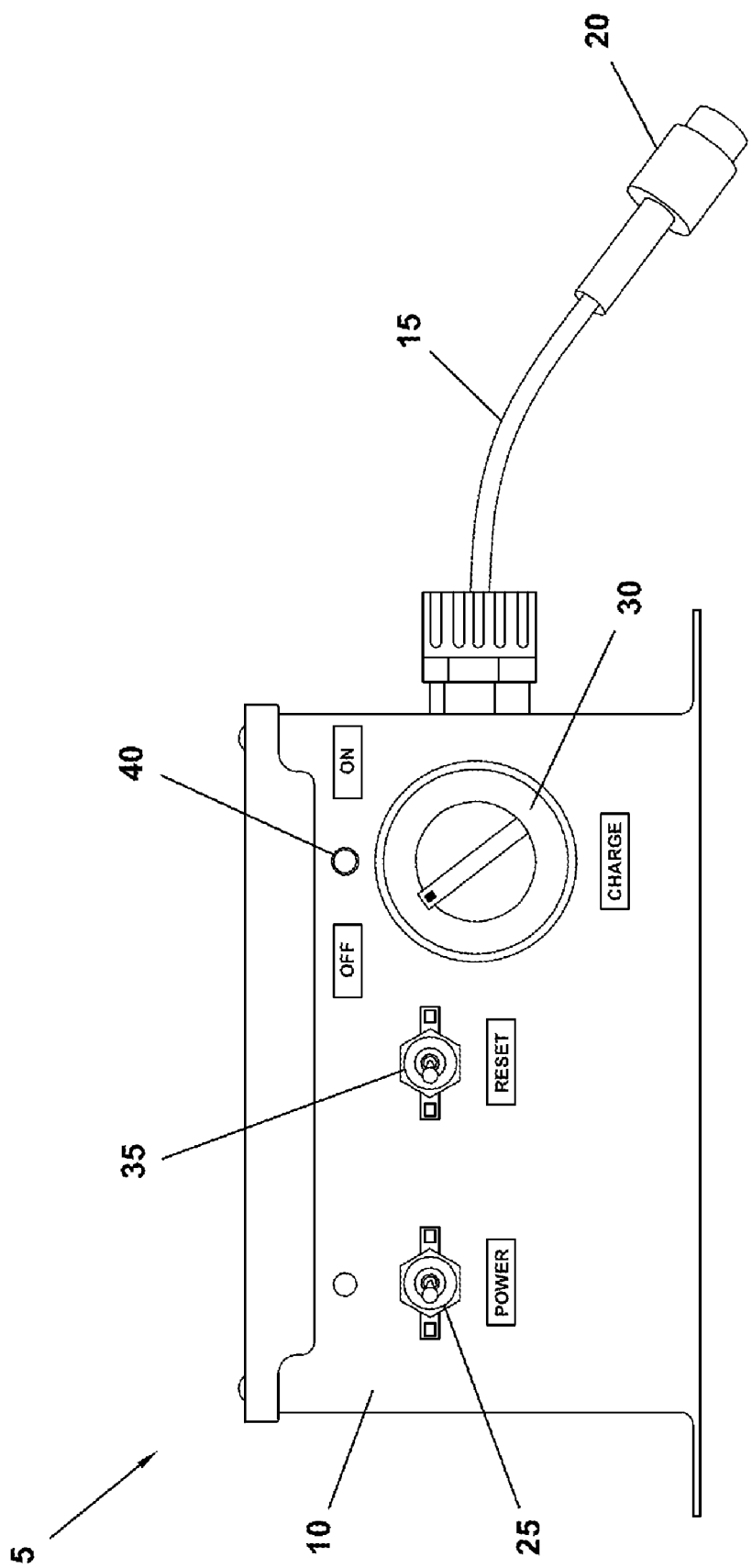
FIG. 1 illustrates one exemplary embodiment of an encoder reset device of the present invention.

An exemplary embodiment of an encoder reset device 5 of the present invention can be seen in FIG. 1. As shown, this particular embodiment includes an enclosure 10 that houses the electronic components and circuitry associated with the encoder reset device 5 (see FIG. 2). The enclosure 10 may be of virtually any shape and size, and may be constructed from a variety of materials.

A connecting cable 15 is shown to extend from the enclosure 10. The free end of the connecting cable 15 terminates in a connector 20 appropriate for connection to the particular encoder (not shown) to be reset. The connector 20 may be detachable. Detachability of the connecting cable 15 and/or connector 20 permits the connector or the connecting cable/connector assembly to be replaced as required for connection to different encoders. Other means for effecting connection between an encoder reset device of the present invention and a variety of encoders/encoder connectors may also be employed, and all such means are considered to be within the scope of the present invention.

Although not shown herein, the connector 20 is pre-jumpered as required to reset the particular encoder with which the reset device 5 is being used. Jumpering of the connector 20 may be accomplished in a variety of ways that would be understood by one skilled in the art including, without limitation, temporary means such as jumper wires or permanent means such as soldering. Jumpering of the connector 20 is preferably performed on an area of the connector that will not affect connection thereof with the corresponding connector of an encoder. In furtherance of permitting use of device of the present invention with a variety of encoders, a multitude of pre-jumpered connectors may be constructed for use with various encoders. The information necessary to properly jumper a connector for use in the reset process is available from encoder manufacturers and/or manufacturers of encoder-equipped devices.

A variety of control actuators may be associated with the enclosure 10 of the encoder reset device 5. As shown, this exemplary embodiment includes a master power switch 25, a charging control switch 30 and a reset switch 35. The function of each of these control actuators is described in more detail below with respect to FIG. 3. Of course, a lesser or greater number of control actuators may be present, and the control actuators may initiate the aforementioned or other functions. One or more indicators may also be associated with the enclosure 10, such as various status-indicating LED's 40 and the like.

Figure 2:
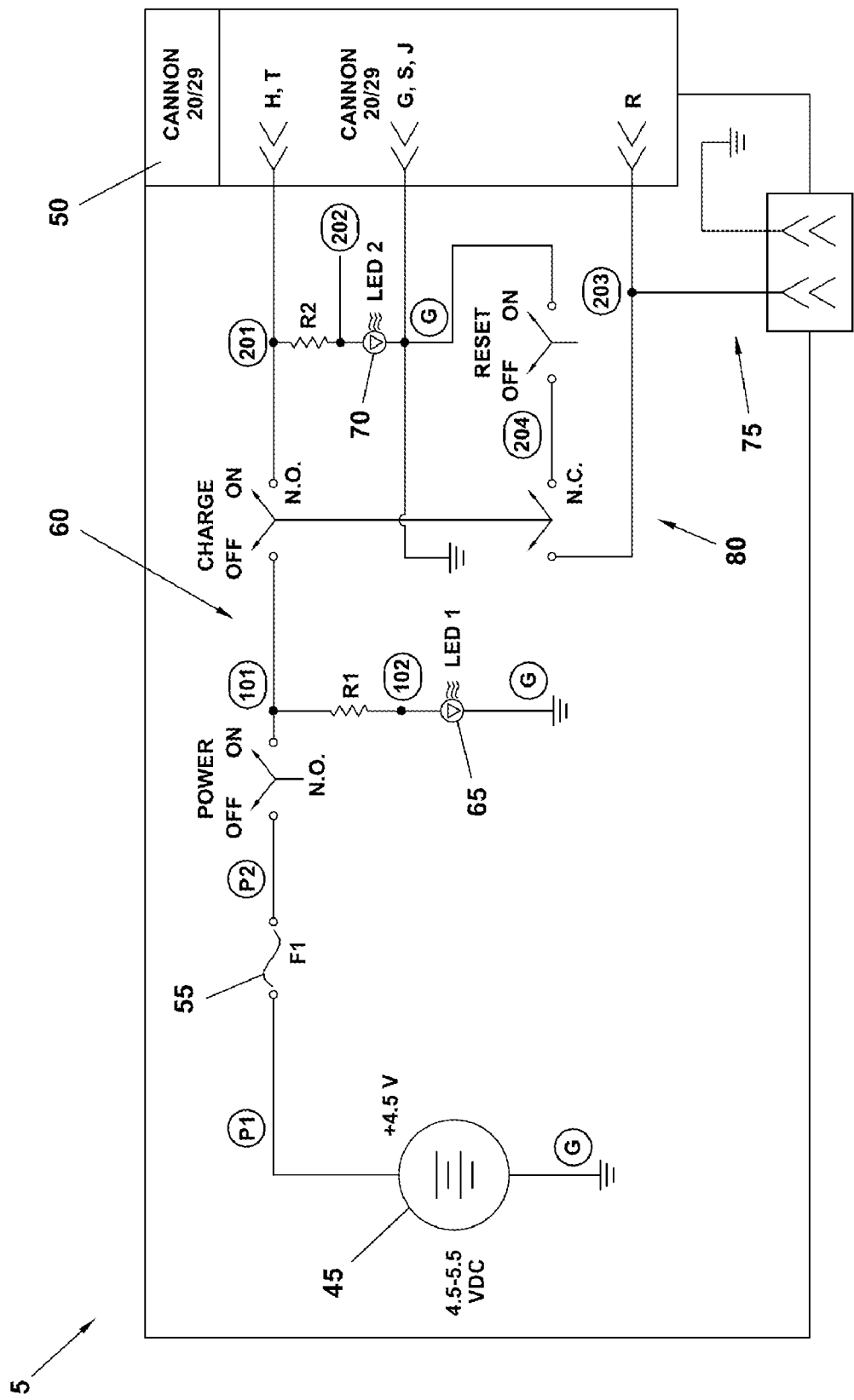
FIG. 2 is a schematic diagram that represents the electronic circuitry associated with the encoder reset device of FIG. 1.

A schematic diagram representing the electric components and related circuitry of the exemplary encoder reset device 5 is shown in FIG. 2. As can be seen, the reset device 5 operates on a power source 45 of between about 4.5-5.5 V. In this particular embodiment, the power source 45 consists of three AA batteries. As would be realized by one skilled in the art, however, an encoder reset device of the present invention could also be powered by a DC power supply of appropriate output, the DC power supply in turn connected to an AC power source.

The reset device 5 is connected to a corresponding encoder connecter 50. In this embodiment, the connector 50 consists of what is commonly referred to as a Cannon plug. Preferably, a fuse or breaker 55 is provided to protect the encoder circuitry.

To operate the reset device 5 after its connection to the encoder connector 50, the master power switch 25 is moved to the "on" position. Preferably, the master power switch is a normally open switch, and may be of the toggle variety. Moving of the master power switch 25 to the "on" position supplies electrical energy to the charge circuit 60 and/or reset circuit 80 and, in this embodiment, also powers the power on LED 65.

Charging of the encoder is effectuated by subsequently moving the charging control switch 30 to the "on" or charge position. The charging control switch 30 preferably has both normally open and normally closed contacts $30_o$, $30_c$. When the charging control switch 30 is moved to the "on" position, the normally open contact $30_o$ is closed and electrical energy is supplied to the encoder via the encoder connector 50. A charging LED 70 is also energized. In this embodiment, the encoder is charged via pins H and T of the encoder connector 50. Moving of the charging control switch 30 to the "on" position also opens the normally closed contact $30_c$, which prevents resetting of the encoder while it is being charged.

The reset device 5 may also be provided with an optional voltage monitoring circuit 75, which preferably includes an associated voltage display device on the enclosure. The voltage monitoring circuit 75 is connected to the encoder connector 50 and allows for the encoder voltage to be monitored during the encoder reset operation. While optional, use of the voltage monitor 75 can help a user of the device to know when an encoder has been sufficiently charged.

Once an encoder has been sufficiently charged, such as by the process described above or by some other means, the reset device 5 can be used to reset the encoder. If the reset device 5 was being used to first charge the encoder, the charging control switch 30 is first moved to the "off" position. This opens normally open contact $30_o$ and closes normally closed contact $30_c$. As such, electrical energy is subsequently supplied to the reset circuit 80.

The reset switch 35 can then be operated to reset the encoder by supplying electrical energy, via the reset circuit 80, to pins G, S, J and R of the encoder connector 50. Once the encoder has been reset, the reset device 5 can be disconnected therefrom, and the encoder-equipped device can be installed.

While one exemplary embodiment of a reset device 5 is depicted in FIGS. 1-2 and has been described above, it is to be understood that a multitude of modifications could be made thereto and still fall within the scope of the present invention. For example, the appearance of a reset device of the present invention, the number and type of actuator controls present, and the exact circuitry may vary somewhat while still performing the same function. Furthermore, while the exemplary embodiment of the reset device 5 has been described with respect to charging and resetting a particular exemplary encoder (e.g. a Yaskawa encoder), it is to be understood that a reset device of the present invention can be used with any number of encoders employing a similar reset process. Consequently, the size of the power source, the type of connector used, and the pins of the device connector and encoder connector involved can vary.

Therefore, while certain exemplary embodiments of an encoder reset device and method of the present invention have been described in detail above, these embodiments have been provided for purposes of illustration only, and nothing herein is intended to limit the present invention to the exemplary embodiment shown and/or described. As such, the scope of the invention is not to be considered limited by such disclosure, and modifications are possible without departing from the spirit of the invention as evidenced by the following claims:

What is claimed is:

1. An encoder reset device, comprising:
an enclosure having a power source associated therewith;
a connector in electrical communication with said power source, said connector for connection to a corresponding encoder connector and pre-jumpered so as to provide electrical energy to particular reset contacts of said encoder connector; and
a reset switch on said enclosure for initiating a flow of electrical energy from said power source to said encoder via said reset contacts of said encoder connector to reset said encoder.

2. The encoder reset device of claim 1, wherein said power source is located within said enclosure.

3. The encoder reset device of claim 1, wherein said connector is coupled to said power source via a flexible cable.

4. The encoder reset device of claim 1, wherein said connector is interchangeable.

5. The encoder reset device of claim 1, wherein said connector is interchangeable with other pre-jumpered connectors.

6. The encoder reset device of claim 1, further comprising a reset circuit for controlling the flow of electrical energy from said power source to said encoder via said reset contacts of said encoder connector.

7. The encoder reset device of claim 6, further comprising a power switch located on said enclosure for initiating a flow of electrical energy from said power source to said reset circuit.

8. The encoder reset device of claim 1, further comprising a charging circuit for controlling the flow of electrical energy from said power source to said encoder via particular charging contacts of said encoder connector.

9. The encoder reset device of claim 8, further comprising a charging switch located on said enclosure for initiating a flow of electrical energy through said charging circuit.

10. The encoder reset device of claim 8, further comprising a power switch located on said enclosure for initiating a flow of electrical energy from said power source to said charging circuit.

11. The encoder reset device of claim 8, wherein electrical energy is prohibited from flowing to said reset contacts of said encoder connector while said charging circuit is activated.

12. The encoder reset device of claim 1, further comprising a voltage monitoring circuit, having voltage display device.

13. The encoder reset device of claim 1, further comprising one or more indicators on said enclosure for indicating the status of said device and/or said encoder.

14. An encoder reset device, comprising:
a portable enclosure;
a power source located within said enclosure;
electronic circuitry located within said housing, said electronic circuitry including at least a charging circuit and a reset circuit in communication with said power source;
a connector in electrical communication with said charging circuit and said reset circuit, said connector for connection to a corresponding encoder connector and pre-jumpered as required to charge and reset said encoder;
a charging switch located on said enclosure for initiating a flow of electrical energy through said charging circuit to predetermined charging contacts of said encoder connector; and
a reset switch on said enclosure for initiating a flow of electrical energy through said reset circuit to predetermined reset contacts of said encoder connector;
whereby said encoder is charged and subsequently reset by said encoder reset device.

15. The encoder reset device of claim 14, wherein said connector is coupled to said charging circuit and said reset circuit via a flexible cable.

16. The encoder reset device of claim 14, wherein said connector is interchangeable.

17. The encoder reset device of claim 16, wherein said connector is interchangeable with other pre-jumpered connectors.

18. The encoder reset device of claim 14, further comprising a power switch located on said enclosure for initiating a flow of electrical energy from said power source to said charging circuit and said reset circuit.

19. The encoder reset device of claim 14, wherein said reset circuit is deactivated when said charging circuit is activated.

20. The encoder reset device of claim 14, further comprising a voltage monitoring circuit.

21. The encoder reset device of claim 20, further comprising an associated voltage display device on said enclosure.

22. The encoder reset device of claim 14, further comprising one or more indicators on said enclosure for indicating the status of said device and/or said encoder.

23. A method of charging and resetting an encoder, comprising:
providing an encoder reset device, said encoder reset device, further comprising:
an enclosure,
a power source located within said enclosure,
electronic circuitry located within said housing, said electronic circuitry including at least a charging circuit and a reset circuit in communication with said power source,
a connector in electrical communication with said charging circuit and said reset circuit, said connector for connection to a corresponding encoder connector and pre-jumpered as required to charge and reset said encoder,
a charging switch located on said enclosure for initiating a flow of electrical energy through said charging circuit to predetermined charging contacts of said encoder connector, and
a reset switch on said enclosure for initiating a flow of electrical energy through said reset circuit to predetermined reset contacts of said encoder connector,
connecting said connector of said device to said corresponding encoder connector;
activating said charging circuit to charge said encoder;
once said encoder is sufficiently charged, activating said reset circuit to reset said encoder; and
disconnecting said connector of said device from said corresponding encoder connector.

24. The method of claim 23, further comprising providing a power switch on said enclosure for initiating a flow of electrical energy from said power source to said charging circuit and said reset circuit.

25. The method of claim 23, wherein said reset circuit is deactivated when said charging circuit is activated.

26. The method of claim 23, further comprising providing a voltage monitoring circuit.

27. The method of claim 26, further comprising providing an associated voltage display device on said enclosure, and using said voltage display device to determine when said encoder has been sufficiently charged.

28. The method of claim 23, further comprising providing one or more indicators on said enclosure for indicating the status of said device and/or said encoder.

* * * * *